United States Patent
Suzuki et al.

(10) Patent No.: US 6,594,114 B1
(45) Date of Patent: Jul. 15, 2003

(54) DAMPER AND HEAD SUSPENSION HAVING THE SAME

(75) Inventors: Nobuharu Suzuki, Osaka (JP); Hiroyuki Iida, Osaka (JP)

(73) Assignee: Nitto Denko Corporation, Osaka (JP)

(*) Notice: Subject to any disclaimer, the term of this patent is extended or adjusted under 35 U.S.C. 154(b) by 0 days.

(21) Appl. No.: 09/533,675

(22) Filed: Mar. 23, 2000

(30) Foreign Application Priority Data

Mar. 24, 1999 (JP) ............................................. 11-079767
Feb. 16, 2000 (JP) ........................................ 2000-037678

(51) Int. Cl.[7] ............................................... G11B 21/16
(52) U.S. Cl. .................................................... 360/244.3
(58) Field of Search ............................. 360/240, 244.3, 360/244.2, 244.4, 244.7; 428/212, 195, 327, 461

(56) References Cited

U.S. PATENT DOCUMENTS

| | | | | | |
|---|---|---|---|---|---|
| 4,704,325 A | * | 11/1987 | Crocker | ....................... | 428/323 |
| 4,819,094 A | * | 4/1989 | Oberg | ......................... | 360/104 |
| 5,021,905 A | * | 6/1991 | Sleger | ..................... | 360/97.02 |
| 5,214,549 A | * | 5/1993 | Baker et al. | ............. | 360/97.01 |
| 5,260,127 A | * | 11/1993 | Umise et al. | ................ | 428/327 |
| 5,351,940 A | * | 10/1994 | Yano et al. | .................. | 267/153 |
| 5,702,556 A | * | 12/1997 | Okuma et al. | .............. | 156/261 |
| 5,771,135 A | * | 6/1998 | Ruiz et al. | .................. | 360/104 |
| 5,777,405 A | * | 7/1998 | Kurozumi et al. | .... | 310/40 MM |
| 5,781,373 A | * | 7/1998 | Larson et al. | ............ | 360/97.02 |
| 5,793,569 A | * | 8/1998 | Christianson et al. | ....... | 360/104 |
| 5,840,072 A | * | 11/1998 | Carey | ......................... | 604/290 |
| 5,864,445 A | * | 1/1999 | Bennin et al. | .............. | 360/104 |
| 5,907,452 A | * | 5/1999 | Kan | ........................ | 360/97.01 |
| 5,939,179 A | * | 8/1999 | Yano et al. | ................. | 428/212 |
| 5,955,176 A | * | 9/1999 | Erpelding et al. | .......... | 428/209 |
| 6,013,353 A | * | 1/2000 | Touhsaent | ................... | 428/203 |
| 6,215,623 B1 | * | 4/2001 | Zhu | ........................ | 360/244.3 |

* cited by examiner

*Primary Examiner*—Hoa T. Nguyen
*Assistant Examiner*—Dzung C Nguyen
(74) *Attorney, Agent, or Firm*—Sughrue Mion, PLLC

(57) ABSTRACT

A damper which is adhered to the head suspension of a disc drive, which comprises a constraint layer/viscoelastic layer laminate, wherein the viscoelastic layer is temporarily provided with a release sheet that is removed on use so that the damper may be adhered to the head suspension, the side of the release sheet in contact with the viscoelastic layer having been treated with a non-silicone releasing agent, preferably a long-chain alkyl type or fluoroacrylate type releasing agent. No silicone is transferred to the viscoelastic layer so that silicone gas generation causing destruction of the memory layer of a disc can be prevented.

5 Claims, 1 Drawing Sheet

DAMPER AND HEAD SUSPENSION HAVING THE SAME

FIELD OF THE INVENTION

This invention relates to a damper adhered to a head suspension of a disc drive and a head suspension having the damper.

BACKGROUND OF THE INVENTION

Disc drives for rotating a recording disc, such as a hard disc drive and a magnetooptical disc drive, have a read/write head part. As shown in FIG. 2A, the head part is made up of a head 1 (e.g., a magnetic head or an optical head) and a head suspension 2 supporting the head 1. Numeral 3 is a block on which the head suspension is fixed.

Since the head portion directly receives air pressure from a rotating disc and vibrations transmitted from the drive of the head 1 or the motor for rotating the disc, it follows that the head suspension 2 formed of a leaf spring, etc. is deformed to shift the position of the head 1, causing reading or writing errors.

In order to damp the vibrations of the head suspension 2, JP-B-4-8868 proposes adhering a damper 4 to a head suspension 2 as shown in FIG. 2B, the damper 4 comprising a laminate of a constraint layer and a viscoelastic layer. According to this proposal, the viscoelastic layer sandwiched in between the vibrating head suspension 2 and the constraint layer is deformed with the vibrational deformation of the head suspension 2 to generate internal resistance (molecular friction) As a result, the vibration energy is converted to heat energy, and the vibration energy directly transmitted to the head suspension 2 is reduced greatly.

To secure such vibration damping effects, it is important for the constraint layer to have high rigidity. Usually employed constraint layers include plates of metals, such as stainless steel, and plastic films. The viscoelastic layer is conventionally made mainly of pressure-sensitive adhesives, rubber, and the like.

Discs and disc drives having the above-described constitution are precise parts. Hence, they are liable to suffer from troubles attributed to, for example, corrosion by organic gases. The hard disc drives, in particular, are almost sealed in nature of its structure so that the inside atmosphere is liable to have an increased temperature, and the generated organic gases is liable to be confined, which would accelerate corrosion. Of organic gases, silicone gas is to be deposited on the disc. The disc having silicone deposit will have an increased coefficient of friction, and the heat generated by friction with a head may destroy the memory layer of the disc. This has become an important problem.

Since the above-described damper is stuck to a head suspension on its viscoelastic layer side, the viscoelastic layer is usually made of a pressure-sensitive adhesive, and a release sheet (separator) is temporarily adhered to the viscoelastic layer, which is stripped on use.

Conventional release sheets usually rely on silicone releasing agents for the release properties. However, silicone of the silicone releasing agent is transferred to the viscoelastic layer when the release sheet is removed and will give off silicone gas, which can cause destruction of the memory layer of a disc.

SUMMARY OF THE INVENTION

Accordingly, an object of the present invention is to provide a damper for a head suspension which will not cause destruction of the memory layer of a disc attributable to silicone gas and a head suspension having the damper thereon.

In order to accomplish the above object, the present invention provides in its first aspect a damper which is adhered to the head suspension of a disc drive, which comprises a laminate of a constraint layer and a viscoelastic layer, wherein the viscoelastic layer is temporarily provided with a release sheet that is removed on use so that the damper may be adhered to the head suspension, the side of the release sheet in contact with the viscoelastic layer having been treated with a non-silicone releasing agent.

In a highly preferred embodiment, the non-silicone releasing agent is a long-chain alkyl type releasing agent or a fluoroacrylate type releasing agent.

The present invention also provides in its second aspect a head suspension for the head of a disc drive which has on at least a part thereof the above-described damper.

Since the releasing agent of the release sheet adhered to the damper is of non-silicone type, the damper generates no silicone gas while used in a disc drive, not giving rise to such a problem that silicone gas destroys the memory layer of a disc. The above-described preferred releasing agent not only prevents silicone gas generation but exhibits satisfactory release properties equally to silicone type releasing agent.

The term "non-silicone (type)" as used herein means that the releasing agent contains no silicone. The term "silicone" as used herein is intended to include all organopolysiloxanes, such as silicone oil, silicone rubber, and silicone resins.

DETAILED DESCRIPTION OF THE INVENTION

Figure 1:
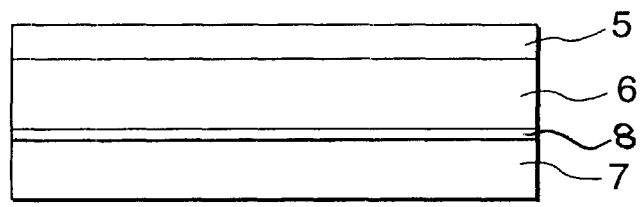
FIG. 1 is a schematic cross section of the damper according to the present invention.

As shown in FIG. 1, the damper of the invention is a unitary laminate of a constraint layer 5 and a viscoelastic layer 6 comprising a pressure-sensitive adhesive. The viscoelastic layer 6 is protected with a release sheet 7, which is stripped off the viscoelastic layer 6 so that the damper can be stuck to a head suspension. Thin layer 8 depicts a non-silicone releasing agent.

The material of the constraint layer 5 is not limited. Metal plates or plastic films are usually used. The constraint layer 5 having a higher elastic modulus exhibits more excellent vibration damping properties. It is preferred to use a material having an elastic modulus of 2.943 $GN/m^2$ (300 $kg/mm^2$) or more as measured in accordance with JIS K7127. Materials preferred from this viewpoint include metal plates, such as a stainless steel plate, an aluminum plate, a copper plate, a phosphor bronze plate, and a beryllium plate; and plastic films, such as a polyimide resin film, a biaxially stretched polyethylene terephthalate (PET) film, a biaxially stretched polypropylene film, an aramid resin film, and a polyethylene naphthalate (PEN) film. In order to improve the elastic modulus, the plastic films can contain inorganic fillers, such as alumina, boron nitride or silicon nitride, or metal powder, such as aluminum or iron powder. The plastic films can contain other fillers having a higher elastic modulus than plastic films, such as organic compounds.

While the constraint layer 5 is not limited in thickness, it is preferred to use a metal plate having a thickness of 10 to 150 μm or a plastic film having a thickness of 20 to 200 μm. Metal plates thinner than 10 μm or plastic films thinner than 20 μm tend to have an insufficient function as a constraint layer. Metal plates thicker than 150 μm or plastic films thicker than 200 μm tend to hinder the functions of the head suspension as a spring.

While the material of the viscoelastic layer 6 is not particularly limited, it is preferred to use acrylic pressure-sensitive adhesives that are generally excellent in vibration damping properties and heat resistance. Because the inside temperature of a hard disc drive, for example, sometimes reaches 50 to 60° C., it is not favorable to use materials which have poor heat resistance and are apt to undergo thermal deformation or thermal deterioration, such as butylated pressure-sensitive adhesives. Silicone pressure-sensitive adhesives, which are known as heat-resistant pressure-sensitive adhesives, are generally unsuitable in the field of the invention on account of possibility of contaminating the memory layer.

The acrylic pressure-sensitive adhesives which can be used in the invention include those obtained by the process for producing an adhesive of tape form disclosed in JP-A-5-132658, which comprises ultraviolet polymerization of a monomer mixture comprising an alkyl acrylate monomer, a carboxyl-containing monomer, a photopolymerization initiator, and a crosslinking agent. The alkyl acrylate monomer to be used usually contains 8 to 12 carbon atoms in the alkyl moiety thereof.

While not limiting, the thickness of the viscoelastic layer 6 formed of the pressure-sensitive adhesive prepared by the above process suitably ranges from 15 to 250 μm. With a thickness smaller than 15 μm, the damping effect tends to be insufficient. If the thickness exceeds 250 μm, the characteristics of the head suspension as a spring may be impaired.

The release sheet 7 to be temporarily provided on the viscoelastic layer 6 has the surface treated with a non-silicone releasing agent as the surface to be brought into contact with the viscoelastic layer 6. This is the greatest feature of the present invention.

The substrate of the release sheet 7 is made of a non-silicone material. For example, a plastic film, such as a polyethylene terephthalate (PET) film, a polyethylene film, or a polypropylene film, is used as a substrate. As, the release sheet 7 should have good releasability from the viscoelastic layer 6, the substrate is treated with a non-siliconel releasing agent, preferably a long-chain alkyl type releasing agent or a fluoroacrylate type releasing agent. The coated amount of the non-silicone releasing agent is preferably from 0.02 to 3 g/m².

The long-chain alkyl type releasing agent preferably includes copolymers comprising, as a vinyl monomer, at least one acrylic or methacrylic ester represented by formula (I):

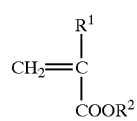

$$CH_2=\underset{\underset{COOR^2}{|}}{\overset{\overset{R^1}{|}}{C}} \tag{I}$$

wherein $R^1$ represents a hydrogen atom or an alkyl group (preferably a methyl group); and $R^2$ represents an alkyl group (preferably having 1 to 16 carbon atoms), and copolymers comprising at least one acrylamide or methacrylamide represented by formula (II):

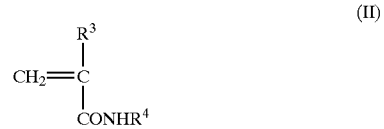

$$CH_2=\underset{\underset{CONHR^4}{|}}{\overset{\overset{R^3}{|}}{C}} \tag{II}$$

wherein $R^3$ represents a hydrogen atom or an alkyl group (preferably a methyl group); and $R^4$ represents an alkyl group (preferably having 12 to 30 carbon atoms).

Examples of the comonomer which the copolymer containing the monomer represented by formula (I) or (II) can contain include an acrylic acid, acrylate, methacrylic acid, methacrylate, acrylonitrile, and vinyl acetate. The copolymer may contain the monomer represented by formula (I) and contain the monomer represented by formula (II) in combination.

The copolymer comprising the (meth)acrylic ester of formula (I) includes an octadecyl acrylate-acrylic acid copolymer. The copolymer comprising the (meth)acrylamide of formula (II) includes an octadecylacrylamide-acrylic acid copolymer.

In addition, polyvinyl carbamate, cellulose tristearate, and the like are also included in useful long-chain alkyl type releasing agents.

The fluoroacrylate type releasing agent preferably includes copolymers comprising at least one compound represented by formula (III):

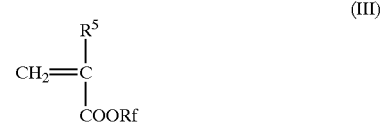

$$CH_2=\underset{\underset{COORf}{|}}{\overset{\overset{R^5}{|}}{C}} \tag{III}$$

wherein $R^5$ represents a hydrogen atom or an alkyl group (preferably a methyl group); and Rf represents a fluorine-substituted alkyl group (preferably having 2 to 25 carbon atoms), which may contain a hydroxyl group.

The fluorine-substituted alkyl group as Rf in formula (III) includes $-CH_2CF_2CF_3$, $-CH_2CH_2(CF_2)_nCF_3$, $-CH_2CH_2(CF_2)_nCF(CF_3)_2$, $-CH_2CF_3-$, $-CH_2(CF_2)_nCHF_2$, $-CH_2CH(OH)CH_2(CF_2)_nCF_3$, and $-CH_2CH(OH)CH_2(CF_2)_nCF(CF_3)_2$, wherein n represents a positive integer. The alkyl group as $R^5$ includes a hydrogen atom or a methyl group.

Examples of the comonomer which the copolymer containing the monomer represented by formula (III) can contain include an acrylic acid, acrylate, methacrylic acid, methacrylate, acrylonitrile, vinyl acetate, and the monomer represented by formula (II) or (III). The copolymer may contain two or more of the monomers represented by formulae (III) in combination.

The non-silicone releasing agent is preferably prepared by polymerization in an organic solvent, such as toluene. The resulting polymer is diluted with an organic solvent, such as xylene, and the polymer solution is applied to the plastic film and dried to remove the solvent in an oven, etc.

The damper of the invention is produced, for example, as follows. The constraint layer 5 and the viscoelastic layer 6 which are positioned to face each other are combined by an appropriate means to obtain a laminate. For example, the two members are press-bonded through a pair of rubber rolls or in a press. The laminate can also be obtained by applying a pressure-sensitive adhesive for forming the viscoelastic layer 6 directly to the constraint layer 6 followed by drying to form the viscoelastic layer 6.

Separately, a substrate, such as a plastic film, is coated with the above-described non-silicone releasing agent solution in a conventional manner and dried to obtain the release sheet 7 having release properties.

Figure 2A:
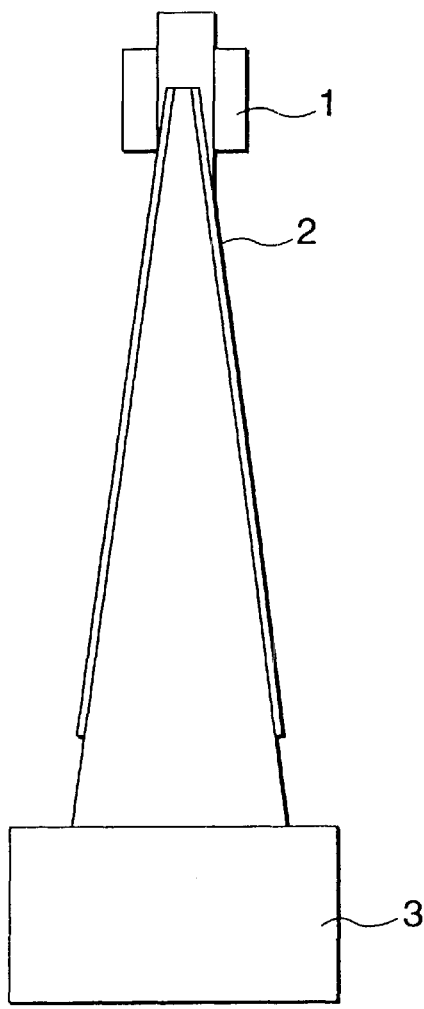
FIG. 2A shows a head suspension.
Figure 2B:
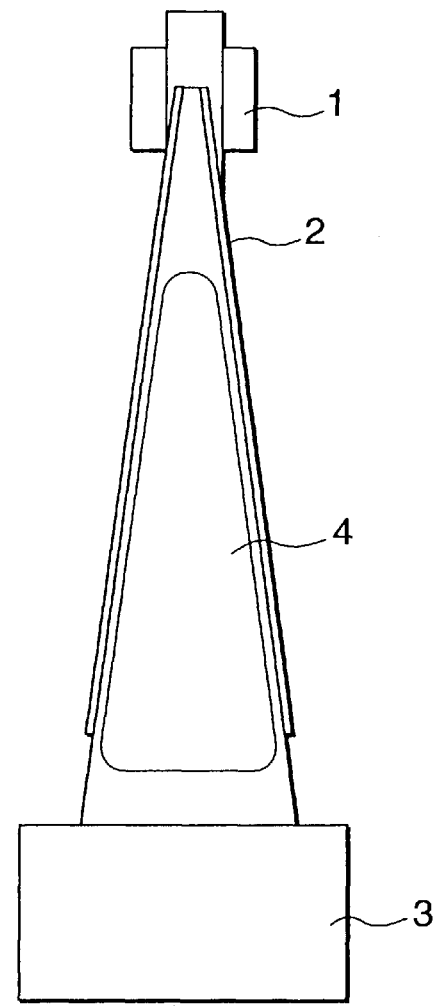
FIG. 2B shows the head suspension with the damper of the invention adhered thereto.

The release sheet 7 is applied to the viscoelastic layer 6 in a known manner to obtain the damper shown in FIG. 1. On use, the release sheet 7 is stripped off the viscoelastic layer 6, and the exposed viscoelastic layer 6 is stuck to the central portion of a head suspension 2 by making use of the adhesive properties of the viscoelastic layer 6 as illustrated in FIG. 2B. There is thus obtained a head suspension having excellent properties of effectively preventing errors of the head 1 in writing and reading. The damper can be stuck to an appropriate surface (e.g., the reverse surface or the lateral sides) wholly or partially, as well as the central portion. If desired, the exposed damper can be stuck by means of an adhesive further applied onto the viscoelastic layer 6. The adhesive to be used can be selected appropriately depending on the material of the head suspension 2 from various known adhesives.

The present invention will now be illustrated in greater detail with reference to Examples in view of Comparative Examples, but it should be understood that the invention is not construed as being limited thereto. Unless otherwise noted, all the parts and percents are by weight.

EXAMPLE 1

Preparation of Pressure-sensitive Adhesive Sheet

In a reaction vessel equipped with a stirrer and a thermometer were charged 95 parts of n-butyl acrylate, 5 parts of acrylic acid, 150 parts of toluene, and 0.1 part of azobisisobutyronitrile, and solution polymerization was carried out in a nitrogen gas atmosphere at 60° C. for about 7 hours to obtain a polymer solution. To the polymer solution was added 2 parts, on a solid basis, of trimethylolpropane tris(tolylene diisocyanate) (Coronate L, produced by Nippon Polyurethane Industry. Co., Ltd.) as a crosslinking agent per 100 parts of the solid content of the polymer solution to obtain a pressure-sensitive adhesive.

The resulting pressure-sensitive adhesive was applied to a 38 μm thick PET film by means of an applicator and dried at 130° C. for 5 minutes to form a 50 μm thick pressure-sensitive adhesive layer. The adhesive layer was postcured by aging at 50° C. for 5 days to form a pressure-sensitive adhesive Sheet (viscoelastic layer) on the PET film.

Preparation of Release Sheet

A 10% toluene solution of an octadecyl acrylate-acrylic acid copolymer was diluted with xylene to a concentration of 0.1% and applied to a PET film at a coverage of about 20 g/m², followed by drying at 150° C. for 3 minutes to prepare a release sheet.

Preparation of Damper

A 50 μm thick SUS 304 plate as a constraint layer was positioned over the pressure-sensitive adhesive sheet (viscoelastic layer) and the two members were bonded together through a laminator at 100° C. and 29.4×10⁴ N/m² (3 kg/cm²) at a speed of 2 m/min. The release sheet was laid on the other side of the pressure-sensitive adhesive sheet (viscoelastic layer) with its releasing surface being inside by means of a hand roller. The resulting laminated sheet was punched into 2 mm-squares with a high-speed pressing machine to produce dampers.

EXAMPLE 2

Preparation of Pressure-sensitive Adhesive Sheet

In a reaction vessel equipped with a stirrer and a thermometer were charged 90 parts of isooctyl acrylate, 10 parts of acrylic acid, and 0.6 part of a photopolymerization initiator (Irgacure 184, available from Chiba-Geigy). After thoroughly displacing the vessel with nitrogen gas, the mixture was irradiated with about 100 mJ/cm² of ultraviolet rays from a high-pressure mercury lamp. To the resulting viscous reaction mixture was added 1 part of trimethylolpropane triacrylate as an internal crosslinking agent to prepare a pressure-sensitive adhesive.

The resulting pressure-sensitive adhesive was applied to a 38 μm thick PET film with an applicator to provide a coating thickness of 50 μm, and irradiated with about 1400 mJ/cm² of ultraviolet rays from a high-pressure mercury lamp to form a pressure-sensitive adhesive sheet (viscoelastic layer) on the PET film.

Preparation of Release Sheet

A 10% toluene solution of polyvinyl carbamate was diluted with xylene to provide a concentration of 0.1%, applied to a PET film at a coverage of about 20 g/m², and dried at 150° C. for 3 minutes to prepare a release sheet.

Preparation of Damper

Dampers were obtained in the same manner as in Example 1, except for using the above prepared pressure-sensitive adhesive sheet (viscoelastic layer) and release sheet.

EXAMPLE 3

Preparation of Pressure-sensitive Adhesive Sheet

A pressure-sensitive adhesive sheet (viscoelastic layer) was prepared in the same manner as in Example 1.

Preparation of Release Sheet

A commercially available fluoroacrylate type releasing agent (AG-5650, produced by Asahi Glass Co., Ltd.) was diluted with ethyl acetate to provide a concentration of 0.1%, and the resulting solution was applied to a PET film at a coverage of about 20 g/m², and dried at 150° C. for 3 minutes to prepare a release sheet.

Preparation of Damper

Dampers were obtained in the same manner as in Example 1, except for using the above prepared pressure-sensitive adhesive sheet (viscoelastic layer) and release sheet.

EXAMPLE 4

Preparation of Pressure-sensitive Adhesive Sheet

A pressure-sensitive adhesive sheet (viscoelastic layer) was prepared in the same manner as in Example 2.

Preparation of Release Sheet

In a reaction vessel equipped with a stirrer and a thermometer were charged 100 parts of 2-(perfluorooctyl)ethyl methacrylate, 140 parts of perfluoro(2-butyltetrahydrofuran) (solvent), 90 parts of m-xylene hexafluoride (solvent), and 0.1 part of azobisisobutyronitrile (polymerization initiator), and the mixture was subjected to solution polymerization at 60° C. for about 7 hours in a nitrogen gas atmosphere. The resulting polymer solution was diluted with a 6:4 (by weight) mixed solvent of perfluoro(2-butyltetrahydrofuran) and m-xylene hexafluoride to prepare a 0.1% polymer solution. The polymer solution was applied to a PET film at a coverage of about 20 g/m² and dried at 150° C. for 3 minutes to prepare a release sheet.

Preparation of Damper

Dampers were obtained in the same manner as in Example 1, except for using the above prepared pressure-sensitive adhesive sheet (viscoelastic layer) and release sheet.

EXAMPLE 5

Preparation of Pressure-sensitive Adhesive Sheet

A pressure-sensitive adhesive sheet (viscoelastic layer) was prepared in the same manner as in Example 1.

Preparation of Release Sheet

A 10% toluene solution of an octadecylacrylamide-acrylic acid copolymer was diluted with xylene to provide a concentration of 0.1%, applied to a PET film at a coverage of about 20 g/m$^2$, and dried at 150° C. for 3 minutes to prepare a release sheet.

Preparation of Damper

Dampers were obtained in the same manner as in Example 1, except for using the above prepared pressure-sensitive adhesive sheet (viscoelastic layer) and release sheet.

EXAMPLE 6

Preparation of Pressure-sensitive Adhesive Sheet

A pressure-sensitive adhesive sheet (viscoelastic layer) was prepared in the same manner as in Example 2.

Preparation of Release Sheet

A release sheet was prepared in the same manner as in Example 1, except for replacing the octadecyl acrylate-acrylic acid copolymer with an octadecyl methacrylate-acrylonitrile copolymer.

Preparation of Damper

Dampers were obtained in the same manner as in Example 1, except for using the above prepared pressure-sensitive adhesive sheet (viscoelastic layer) and release sheet.

EXAMPLE 7

Preparation of Pressure-sensitive Adhesive Sheet

A pressure-sensitive adhesive sheet (viscoelastic layer) was prepared in the same manner as in Example 2.

Preparation of Release Sheet

A release sheet was prepared in the same manner as in Example 3, except for replacing the AG-5650 solution with a 0.1% solution of a fluoroacrylate releasing agent of formula III (wherein Rf is a fluorine-substituted alkyl group and $R_5$ is a methyl group) in FR Thinner (fluorine type solvent available from Shin-Etsu Chemical Co., Ltd.) to provide a solution having a concentration of 0.1%.

Preparation of Damper

Dampers were obtained in the same manner as in Example 1, except for using the above prepared pressure-sensitive adhesive sheet (viscoelastic layer) and release sheet.

Comparative Example 1

Preparation of Pressure-sensitive Adhesive Sheet

A pressure-sensitive adhesive sheet (viscoelastic layer) was prepared in the same manner as in Example 1.

Preparation of Damper

A commercially available PET separator having a silicone releasing agent (MRN-38, supplied by Dia Foil K.K.) was adhered to both sides of the above prepared pressure-sensitive adhesive sheet (viscoelastic layer) to obtain a damper.

Comparative Example 2

Preparation of Pressure-sensitive Adhesive Sheet

A pressure-sensitive adhesive sheet (viscoelastic layer) was prepared in the same manner as in Example 2.

Preparation of Damper

The same PET separator as used in Comparative Example 1 was adhered to both sides of the above prepared pressure-sensitive adhesive sheet (viscoelastic layer) to obtain a damper.

The dampers obtained in Examples and Comparative Examples were tested as follows as for transfer of silicone to the viscoelastic layer. Each damper was put in a drier set at 70° C. for 48 hours and then allowed to stand at room temperature for 1 hour. The release sheet was removed, and the surface of the exposed viscoelastic layer was examined by X-ray fluorescence analysis to see whether silicon was detected or not. The results obtained are shown in Table 1.

TABLE 1

|  | Detection of Si |
| --- | --- |
| Example 1 | not detected |
| Example 2 | " |
| Example 3 | " |
| Example 4 | " |
| Example 5 | " |
| Example 6 | " |
| Example 7 | " |
| Compara. Example 1 | detected |
| Compara. Example 2 | " |

As is shown in Table 1 above, with respect to Examples 1 to 7, silicon was not detected from the surface of the viscoelastic layer that had been in contact with the release sheet, indicating that no silicone had been transferred thereto. On the other hand, with respect to Comparative Examples 1 and 2, silicon was detected from the viscoelastic layer, indicating that silicone had been transferred to the viscoelastic layer.

The dampers of Examples 1 to 7, from which the release sheet had been removed, were each stuck to the central, portion of a head suspension via the viscoelastic layer 6 by making use of the adhesive properties of the viscoelastic layer 6 as shown in FIG. 2B. The head suspension 2 was set in a hard disc drive, and the drive was operated for a given period of time. As a result, generation of silicone gas in the drive was not observed, and, necessarily, the problem of memory layer destruction attributable to silicone gas did not occur at all.

As described above, the damper of the invention comprises a constraint layer/viscoelastic layer laminate protected with a release sheet the release properties of which are of non-silicone releasing agent. Therefore, when a head suspension with the damper of the invention stuck to at least a part thereof is used in a disc drive, no silicone gas generates from the damper. As a result, there is no fear that the memory layer of a disc on the drive may be destroyed by silicone gas.

In a highly preferred embodiment of the invention wherein the non-silicone releasing agent is a long-chain alkyl type releasing agent or a fluoroacrylate type releasing agent, the release sheet not only prevents silicone gas generation but exhibits satisfactory release properties equally to silicone type releasing agent.

While the invention has been described in detail and with reference to specific examples thereof, it will be apparent to one skilled in the art that various changes and modifications can be made therein without departing from the spirit and scope thereof.

What is claimed is:

1. A damper for a head suspension of a disc drive, which comprises a constraint layer, a viscoelastic layer and a release sheet, the side of said release sheet in contact with said viscoelastic layer having been coated with a non-silicone releasing agent.

2. The damper of claim 1, wherein said non-silicone releasing agent is a long-chain alkyl type releasing agent or a fluoroacrylate type releasing agent.

3. A head suspension for the head of a disc drive which has on at least a part thereof a damper comprising a constraint layer and a viscoelastic layer, wherein said viscoelastic layer has been temporarily provided before use with a release sheet the side of which in contact with said viscoelastic layer having been coated with a non-silicone releasing agent.

4. The head suspension of claim 3, wherein said non-silicone releasing agent is a long-chain alkyl type releasing agent or a fluoroacrylate type releasing agent.

5. A method of manufacturing a head suspension for a disc drive which has a damper on at least a part of the suspension, comprising providing a damper comprising a constraint layer, a viscoelastic layer and a release sheet, the side of said release sheet in contact with said viscoelastic layer having been coated with a non-silicone releasing agent, removing the release sheet from said damper, and applying the damper having said release sheet removed to said suspension.

* * * * *